April 14, 1931. H. BOE 1,800,773
RECEPTACLE HANDLE HOLDER
Filed Dec. 6, 1928
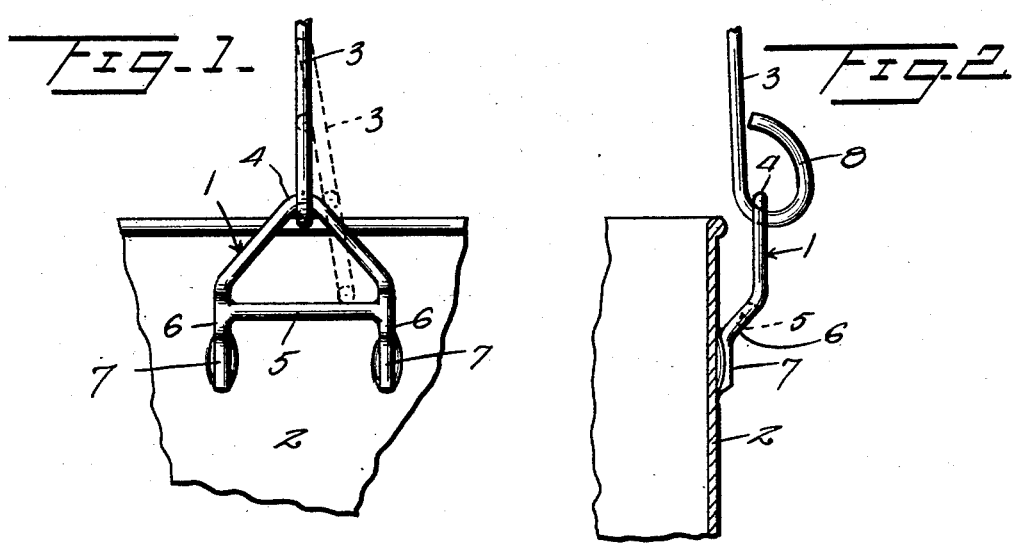
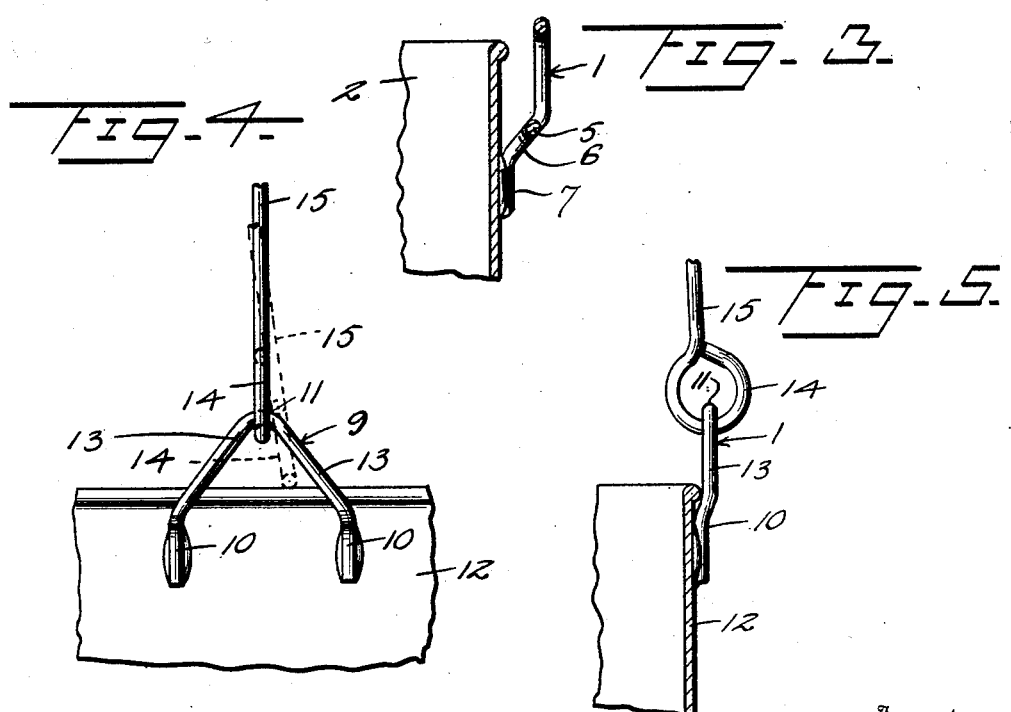
Inventor
Henry Boe
By Watson E. Coleman
Attorney Patented Apr. 14, 1931

1,800,773

UNITED STATES PATENT OFFICE

HENRY BOE, OF RUSO, NORTH DAKOTA

RECEPTACLE-HANDLE HOLDER

Application filed December 6, 1928. Serial No. 324,161.

This invention relates to handle holders for receptacles of the type employing a hinged arcuate handle or bail. As is well-known in receptacles having pivoted handles or bails which swing down to position upon one side of the receptacle, the handles become heated with the receptacle when the same is placed over a fire and a holder must be employed in order to enable one to take hold of the handle to lift the receptacle.

The primary object of this invention is to overcome this inconvenience by forming the ears to which the ends of the bail are attached, in such a manner, that they will maintain the bail in upright position when the same is arranged in a particular position before being released.

The invention broadly contemplates the provision of bails of substantially triangular form each arranged with one point of the angle directed upwardly in which point the loop of the receptacle bail swings when the receptacle is raised. When it is desired to position the bail in upright position the looped ends thereof are allowed to rest upon the base portion of their respective ears, the body of the bail or loop resting against the adjacent inclined side of the ear. In this manner the handle is firmly held in upright position free from a flame over which the receptacle may be positioned.

The invention will be best understood from a consideration of the following detailed description taken in connection with the accompanying drawings forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of one form of my handle attaching ear;

Figure 2 is a view in edge elevation of the same;

Figure 3 is a vertical central sectional view through the same;

Figure 4 is a view in side elevation of another form of the bail attaching ear;

Figure 5 is a view in edge elevation of the same.

Referring to the drawing in detail one form of my invention is shown in Figures 1, 2 and 3. In this form the ear to which the receptacle bail is attached is indicated as a whole by the numeral 1, the receptacle being indicated by the numeral 2 and the bail by the numeral 3. As shown, the ear 1 is of general triangular formation, being arranged in upright position with the point 4 extended upwardly upon a line substantially parallel with the axial center of the receptacle.

The base bar 5 of the ear has the downwardly and inwardly extending portions 6 secured thereto which portions terminate in the straight downwardly extending ends 7 which are secured as by soldering to the body of the receptacle 2. The ear 1 is thus maintained in spaced relation to the adjacent wall of the receptacle. This form is designed to be used where it is desired to arrange the upper ends of the ears in substantially the same plane as the top of the receptacle.

Two of the ears 1, of course, are used, being positioned at diametrically opposite points on the wall of the receptacle and the ends of the bail 3 are formed to provide the loops or eyes 8 which are linked to the ears in the manner shown.

When it is desired to arrange the handle in upright position the same is first raised or, if it is already in raised position as when the receptacle is being set down upon its supporting surface, the loops are lowered until each rests upon the base bar 5 of the attached ear. The bail is then inclined so that the upper portion of the loop will rest against the adjacent inclined portion of the ear with the result that it will be propped in upright position as shown. It will be readily seen that as soon as the bail is grasped and elevated to lift the receptacle, the loops will at once move to the highest point in the ears or at the points 4 thus properly centering the receptacle on the handle.

In the form shown in Figures 4 and 5, a substantially V-shaped ear 8 is employed the end portions 10 being arranged in substantially parallel relation while the point 11 is positioned in a plane above the top edge of the receptacle 12. With this form of ear the inclined portions 13 are positioned against the side wall of the receptacle so that the loop 14 of the bail 15 will rest directly upon the underlying receptacle edge. The method of propping the loop upright is the same as in the form first described except, as above noted, that the loop rests upon the receptacle edge instead of resting upon a cross bar of the ear.

From the foregoing description it will be readily seen that a receptacle handle holder has been provided which will securely maintain the handle in upright position and which can be employed for this purpose without involving any extensive preliminary manipulation of the handle.

While the foregoing description refers particularly to the application of the handle holder or ear to receptacles which are designed to be placed over a heated area to maintain the handle upright so that it will not become hot, it is of course to be understood that although this is a primary use to which the handle ear was put I do not wish to be limited in any manner to such use, for it is apparent that bail attaching ears of the character described in this invention may be advantageously employed on all types of buckets such as milk buckets, water buckets, etc., where it is desirable at times to have the bail remain upright. The ear may also be used upon lanterns where it is frequently desirable that the handle be held in upright position as for example, when the lantern is being elevated to engage the handle over a supporting hook or the like. As has been previously pointed out in all cases where the present bail ears are employed it is only necessary to swing the bail upwardly whereupon when it reaches an upright position the looped ends thereof will each slip to one side of the ear to which it is attached so that the upper portion of each loop will lean against an inclined portion of the ear and the bail will automatically remain in upright position.

Having thus described my invention what I claim is:—

1. Receptacle bail attaching ears comprising upright bodies designed to be attached to the receptacle wall, each having its upper portion formed of a pair of upwardly converging members about which the looped end of a receptacle bail handle engages, and a cross bar between the divergent ends of the members designed to support the adjacent bail loop.

2. The combination with a receptacle, of a pair of bail attaching ears each comprising an upwardly directed pointed frame, means for attaching the frames to the receptacle wall, a bail having each end looped and engaged through a frame, and a bar extending across the lower part of said frame for the support of the adjacent looped bail end.

3. The combination with a receptacle, a pair of bail attaching ears, each consisting of an upper portion having upwardly converging side members and a cross member connecting the divergent lower ends of the members, means extending from points adjacent the ends of the cross member and in an offset plane thereto for connection with a receptacle wall, and a bail having the ends thereof looped and loosely coupled with said upper portion.

4. The combination with a receptacle, of a pair of bail attaching ears each consisting of an inverted substantially V-shaped frame, the legs thereof, at the ends, being substantially parallel and arranged in substantially parallel offset relation to the convergent portions thereof and secured to the receptacle wall adjacent the top edge of the same, and a bail having the ends looped and loosely coupled with the pointed upper ends of the frames substantially as described.

In testimony whereof I hereunto affix my signature.

HENRY BOE.